United States Patent
Komissarchik et al.

(10) Patent No.: US 6,397,185 B1
(45) Date of Patent: May 28, 2002

(54) LANGUAGE INDEPENDENT SUPRASEGMENTAL PRONUNCIATION TUTORING SYSTEM AND METHODS

(75) Inventors: Julia Komissarchik; Edward Komissarchik, both of San Carlos, CA (US)

(73) Assignee: Betteraccent, LLC, Hillsborough, CA (US)

( * ) Notice: Subject to any disclaimer, the term of this patent is extended or adjusted under 35 U.S.C. 154(b) by 0 days.

(21) Appl. No.: 09/282,050

(22) Filed: Mar. 29, 1999

(51) Int. Cl.[7] .............................................. G10L 21/06
(52) U.S. Cl. ........................ 704/270; 704/276; 434/167
(58) Field of Search ................................ 704/270, 276; 434/156, 167, 169

(56) References Cited

U.S. PATENT DOCUMENTS

| | | | | |
|---|---|---|---|---|
| 4,460,342 A | * | 7/1984 | Mills | 434/185 |
| 4,710,877 A | * | 12/1987 | Ahmed | 364/419 |
| 4,989,249 A | * | 1/1991 | Oka et al. | 704/231 |
| 5,010,495 A | * | 4/1991 | Willetts | 364/513.5 |
| 5,212,638 A | * | 5/1993 | Bernath | 364/419 |
| 5,393,236 A | * | 2/1995 | Blckmer et al. | 434/169 |
| 5,487,671 A | * | 1/1996 | Shpiro et al. | 434/185 |
| 5,741,136 A | * | 4/1998 | Kirksey et al. | 434/169 |
| 5,799,276 A | | 8/1998 | Kommissarchik et al. | 704/251 |
| 5,870,709 A | * | 2/1999 | Bernstein | 704/275 |

OTHER PUBLICATIONS

Juang et al, "Automatic Recognition and Understanding of Spoken Language—A First Step Toward Natural Human—Machine Communication", Proceedings of the IEEE, vol. 88, No. 8, 8/00.*

Neumeyer et al, "Automatic Text–Independent Pronunciation Scoring of Foreign Language Student Speech", ICSLP '96, pp 1457–1460.*

Neubert et al, "Directory Name Retrieval Over the Telephone in the Picasso Project", Interactive Voice Technology for Telecom Apps, pp. 31–36.*

Tan et al, "Implementation and Evaluation of A Voice Activated Dialling System", IVT, 1998, pp 83–86.*

Chun, D.M., "Signal Analysis Software for Teaching Discourse Intonation," *Language Learning & Technology*, 2(1):61–77 (1998).

Parsons, T.W., *Voice and Speech Processing*, McGraw–Hill Book Company, 197–208 (1986).

Van Els, T. et al., "The Role of Intonation in Foreign Accent," *The Modern Language Journal*, 71(2):147–155 (1987).

* cited by examiner

Primary Examiner—Fan Tsang
Assistant Examiner—Michael N. Opsasnick
(74) Attorney, Agent, or Firm—Fish & Neave; Nicola A. Pisano

(57) ABSTRACT

A pronunciation training system and methods are provided as a series of programmed routines stored on an item of removable storage media, and select information generated by a speech analysis engine to compute and display graphical representations of metrics useful to a student. The student selects from among a plurality of pre-recorded utterances spoken by a native speaker, and the student then records his or her pronunciation of the utterance. The software computes and displays graphical metrics for the native speaker's utterance and the student's utterance, in any of a variety of formats, on a side-by-side basis. The system also permits the student to repeat selected phrases and to monitor improvement by similarity between the graphical metrics.

40 Claims, 7 Drawing Sheets

LANGUAGE INDEPENDENT SUPRASEGMENTAL PRONUNCIATION TUTORING SYSTEM AND METHODS

FIELD OF THE INVENTION

The present invention relates to apparatus and methods for providing language-independent suprasegmental analysis and audio-visual feedback of prosodic features of a user's pronunciation.

BACKGROUND OF THE INVENTION

The increasing globalization of world economies makes it essential for individuals to be able to communicate successfully in languages other than their own. For individuals to be effective communicators in a new language, it is essential to learn proper pronunciation. Intonation, stress and rhythm are key prosodic features of effective communication and are critical for comprehension. Thus, there is a need for effective pronunciation teaching aids.

Pronunciation training, however, generally is perceived as difficult because it is often hard for a student to pick up the peculiarities of pronunciation of a foreign language. Often, it is difficult for the student even to recognize his or her own mistakes. Moreover, it is often difficult to train teachers to detect errors in pronunciation and therefore provide beneficial feedback to students.

Previously known language training systems generally may be grouped into two categories: (1) systems based on speech analysis (i.e., analysis of how an utterance is pronounced); and (2) systems based on speech recognition (i.e., recognition of what is said). Some systems use a combined approach, in which the speech is partially speech analyzed and partially recognized.

Commercially available systems in the speech analysis category are: The Speech Viewer, available from IBM Corporation, White Plains, N.Y.; VisiPitch, available from Kay Corporation, Lincoln Park, N.J.; and newer versions of Language Now, available from Transparent Language, Inc., Hollis, N.H. All of these systems extract and visualize the pitch of an utterance. An overview of methods for extracting pitch is provided, for example, at pages 197–208 of Parsons, *Voice and Speech Processing,* McGraw-Hill Book Company (1987).

A drawback common to all of the foregoing speech analysis methods is that they extract pitch independently of its relevancy to intonation pattern. Thus, for example, such systems extract pitch even for vocal noises. These previously known systems therefore do not address crucial prosodic parameters of speech, such as rhythm, stress and syllabic structure.

Commercially available systems in the speech recognition category are those offered by: The Learning Company, Knoxville, Tenn.; Transparent Language, Inc., Hollis N.H.; Syracuse Language Systems, Inc., Syracuse, N.Y.; and IMSI, San Rafael, Calif. In addition, several companies offer speech recognition engines, including: Dragon Systems, Newton, Mass.; IBM Corporation, White Plains, N.Y.; and Lernout & Hauspie, Brussels, Belgium.

Most previously known language training systems present a sentence for a student to pronounce, record the student's utterance, and then calculate the distance between the student's utterance and one of a generalized native speaker. The calculated distance is presented to the student in the form of a indicator on a gauge and/or a graphical comparison of a waveform of the student's utterance to the waveform for a native speaker.

A disadvantage common to all of these previously known language training systems is that the grading of the student's utterance is arbitrary and non-specific. In particular, use of just a single parameter—the distance between the student's and native speaker's utterances—provides little useful information. This is because a speech signal represents an intrinsically multi-parametric system, and this richness is not quantifiable using the distance method alone. Additionally, the visual feedback of providing a graphical comparison of the student's unanalyzed waveform provides little useful information. Finally, all of the foregoing systems are language dependent.

Indeed, the literature relating to pronunciation training has recognized the shortcomings of available computer training systems for some time. See, e.g., D. M. Chun, "Signal Analysis Software for Teaching Discourse Intonation," *Lang. Learning & Tech.,* 2(1):61–77 (1998); H. Norman, "Speech Recognition: Considerations for use in Language Learning," EuroCALL '98; and T. Van Els and K. de Bot, "The Role of Intonation in Foreign Accent," *Modern Lang. J.,* 71:147–155 (1987).

U.S. Pat. No. 5,799,276 describes a knowledge-based speech recognition system for translating an input speech signal to text. The system described in that patent captures an input speech signal, segments it based on the detection of pitch period, and generates a series of hypothesized acoustic feature vectors that characterizes the signal in terms of primary acoustic events, detectable vowel sounds and other acoustic features. A largely speaker-independent dictionary, based upon the application of phonological and phonetic/acoustic rules, is used to generate acoustic event transcriptions against which the series of hypothesized acoustic feature vectors are compared to select word choices. Local and global syntactic analysis of the word choices is provided to enhance the recognition capability of the system.

In view of the foregoing, it would be desirable to provide a voice and pronunciation training system that gives more meaningful audio-visual feedback than provided by previously known systems, by providing extensive audio-visual feedback pertinent to prosodic training.

It also would be desirable to provide a voice and pronunciation training system that provides easy-to-understand visualization of intonation, stress and rhythm patterns, visualizes syllabic structure of an utterance, and enables a user to pinpoint his or her pronunciation errors.

It further would be desirable to provide a voice and pronunciation training system that is curriculum independent and may be easily customized for different curricula.

It still further would be desirable to provide a voice and pronunciation training system that is language independent, thereby enabling a student to practice intonation, stress and rhythm patterns of a foreign language using his or her native language or free forms like "ta-ta-ta".

It also would be desirable to provide a voice and pronunciation training system that enables suprasegmental analysis and visual feedback of an utterance for deaf and semi-deaf speakers who require visual feedback during speech training to compensate for hearing imparity, and for use by speech pathologists during their work with patients.

SUMMARY OF THE INVENTION

In view of the foregoing, it is an object of this invention to provide a voice and pronunciation training system that gives more meaningful audio-visual feedback than provided by previously known systems, by providing extensive audio-visual feedback pertinent to prosodic training.

It is also an object of this invention to provide a voice and pronunciation training system that provides easy-to-understand visualization of intonation, stress and rhythm patterns, visualizes syllabic structure of an utterance, and enables a user to pinpoint his or her pronunciation errors.

It further is an object of the present invention to provide a voice and pronunciation training system that is curriculum independent and may be easily customized for different curricula.

It is another object of this invention to provide a voice and pronunciation training system that is language independent, thereby enabling a student to practice intonation, stress and rhythm patterns of a foreign language using his or her native language or free forms like "ta-ta-ta".

It is a still further object of the present invention to provide a voice and pronunciation training system that enables suprasegmental analysis and visual feedback of an utterance for deaf and semi-deaf speakers who require visual feedback during speech training to compensate for hearing imparity, and for use by speech pathologists during their work with patients.

These and other objects of the present invention are accomplished by providing a pronunciation training system and methods that analyze a user's utterance, extracts prosodic features and presents metrics corresponding to those features to a user in an easy-to-understand manner that is language and training curriculum independent. The pronunciation training system and methods are provided as a series of programmed routines stored on an item of removable storage media, such as an optical disk or high capacity floppy disk.

In particular, the student selects from among a plurality of pre-recorded utterances spoken by a native speaker to practice, and selects a graphical presentation mode. The student then records his or her pronunciation of the utterance. A speech analysis engine, such as described in U.S. Pat. No. 5,799,276 is used to analyze a user's utterance to extract prosodic features. The system then computes metrics for the student's utterance, and displays those metrics for the student's utterance and the native speaker's utterance on a side-by-side basis for the selected graphical presentation mode. The system also permits the student to repeat selected phrases and to monitor improvement by similarity between the graphical metrics.

BRIEF DESCRIPTION OF THE DRAWINGS

Further features of the invention, its nature and various advantages will be more apparent from the accompanying drawings and the following detailed description of the preferred embodiments, in which.

DETAILED DESCRIPTION OF THE INVENTION

The present invention relates generally to a system and methods for voice training and accent reduction via audio-visual feedback of the prosodic features of speech. It will of course be understood by those skilled in the relevant arts that these exemplary embodiments of the invention in no way limit the intended use of the pronunciation tutor for accent improvement, and that the present invention may be used for other than accent improvement purposes, such as voice and speech training. In addition, while the present invention employs the knowledge-based speech recognition system described in U.S. Pat. No. 5,799,276, which is incorporated herein by reference, for a first stage of the speech analysis, other speech recognition or analysis systems also may be used.

Figure 1:
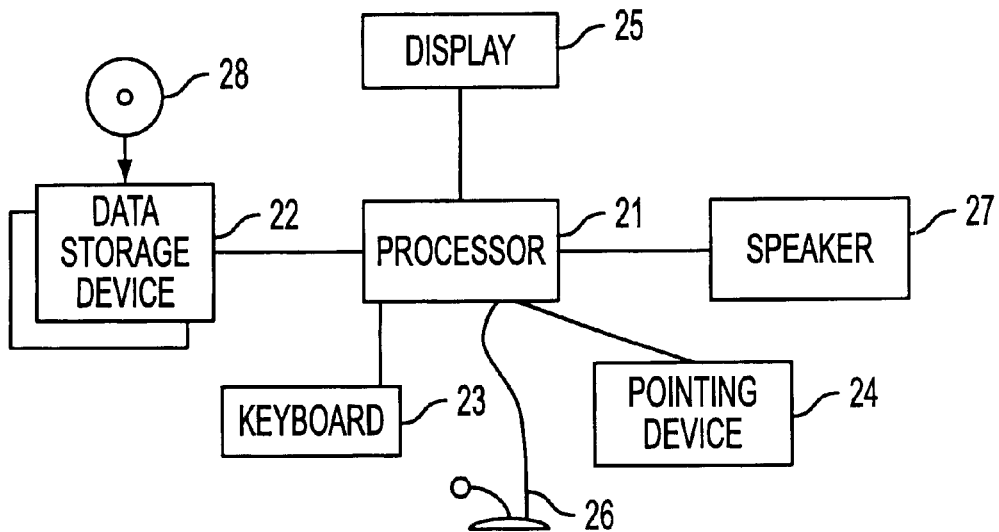
FIG. 1 depicts an illustrative computer system for implementing the software system of the present invention.

Referring to FIG. 1, exemplary apparatus 20 suitable for use in implementing the present invention and methods is described. Apparatus 20 includes main processor 21 (and its associated RAM) and one or more data storage devices 22 (e.g., a hard disk, CD-ROM or DVD drive), and may comprise, for example, a multi-media personal computer, either portable or desk-top. Apparatus 20 further includes keyboard 23, pointing device 24 (e.g., mouse or track ball), display screen 25, microphone 26 and sound card and speakers 27. As is conventional, pointing device 24 has means for positioning the cursor of display 25, and one or more command keys for operating upon icons targeted by the cursor. Computer 20 preferably operates using a Windows operating environment, such as Windows 95®, Windows 98® or Windows NT 4.0® or higher, available from Microsoft Corporation, Redmond, Wash. The system of the present invention may be readily adapted to other computer operating systems.

In accordance with the present invention, a removable item of storage media 28, illustratively a CD-ROM, is provided that may be loaded into a suitable data storage device 22 configured to read such media. The removable item of storage media stores a pronunciation and voice training system, constructed in accordance with the present invention, as a series of programmed routines. As is conventional, the software may be executed by the computer to enable the computer user (hereinafter referred to as a "student") to practice and visualize pronunciation of a series of utterances. The system of the present invention may be implemented in apparatus 20 using Visual Basic or C++ programming languages, as is conventional for Windows-based graphical interfaces, and as would be readily understood by one skilled in the art of Windows-based programming.

Figure 2:
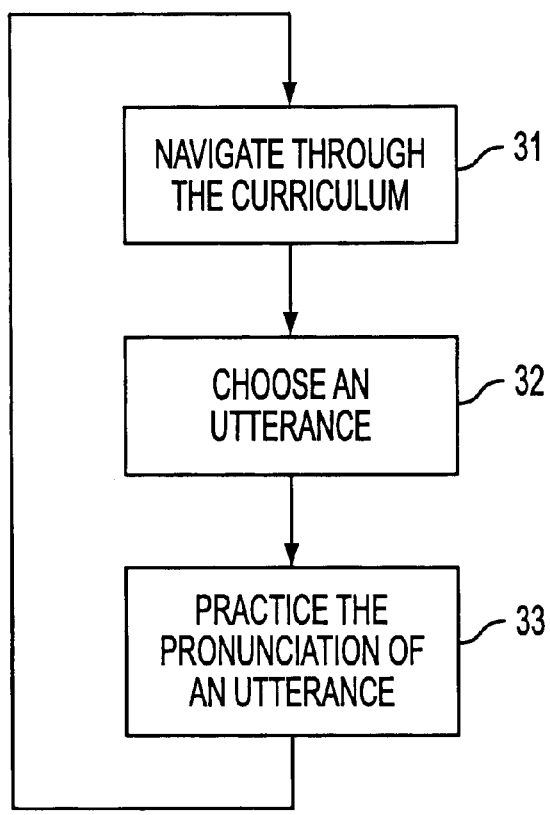
FIG. 2 depicts use of a system constructed in accordance with the principles of the present invention.
Figure 5A:
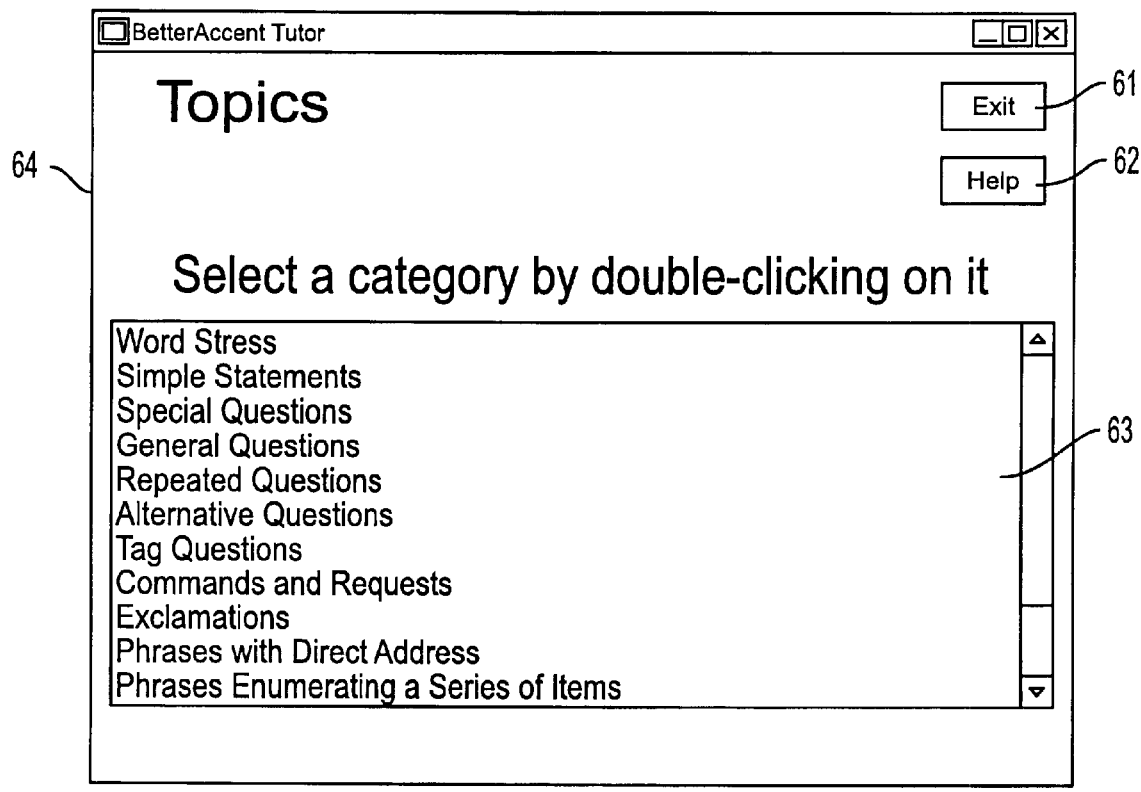
FIGS. 5A and 5B are illustrative examples of navigation screens of a sample curriculum in American English in accordance with a preferred embodiment of the present invention.

Referring now to FIG. 2, use of a system constructed in accordance with the principles of the present invention is described. At block 31, a student navigates through the curriculum by first selecting a training category. A sample screen display showing exemplary choices is depicted in FIG. 5A. The student selects an utterance to practice at block 32, for example, by clicking pointing device 24 over that utterance. At block 33 the student practices pronunciation of the utterance and adjusts his or her pronunciation based on the audio-visual feedback received from the system. Once the student has completed his or her exercises with respect to the utterance chosen at block 33, the student may return to block 31 to practice a different part of the curriculum.

Figure 3:
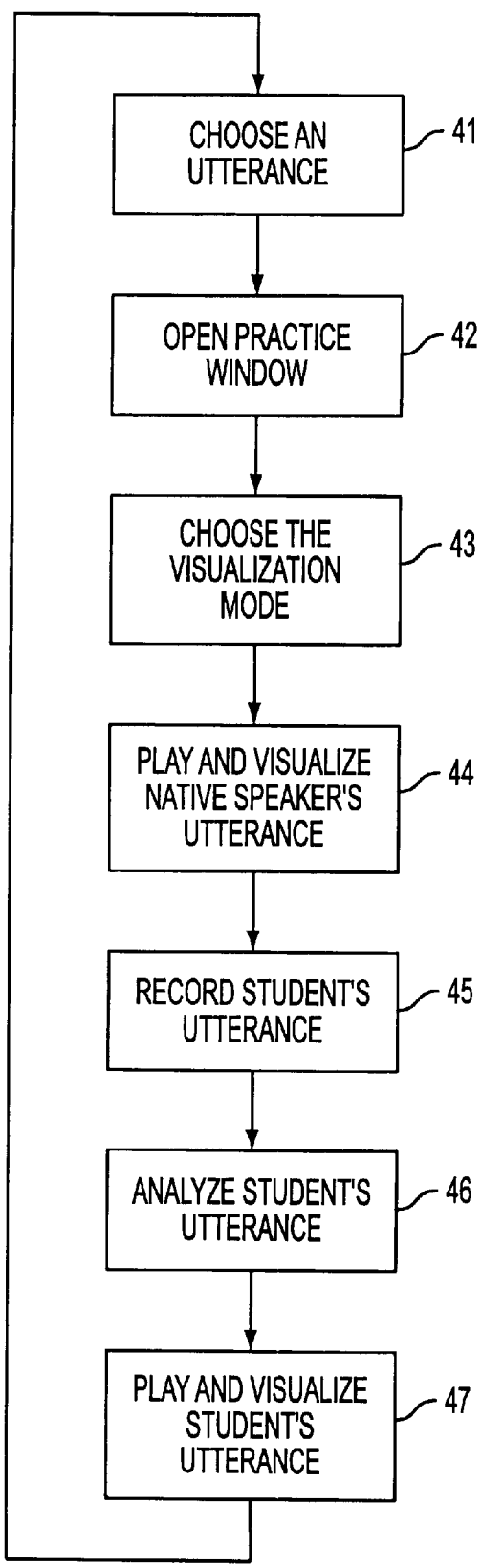
FIG. 3 depicts use of the system of the present invention to practice pronunciation of a particular utterance.

With respect to FIG. 3, the process of practicing pronunciation of a particular utterance is described. At block 41, the student chooses, from a collection of pre-recorded utterances of a native speaker, an utterance to practice. In accordance with one aspect of the invention, the analysis is language independent, so that the system of the present invention may be readily adapted for use by students who study different languages.

Moreover, the system of the present invention is curriculum independent, so that the curriculum may be readily altered by substituting the type and complexity of pre-recorded native speaker utterances available to practice. Preferably, the pre-recorded native speaker utterances may be pre-processed using the techniques described hereinafter to extract the prosodic features, and the utterances and corresponding metrics may be stored as a replaceable module of the software program.

Figure 5B:
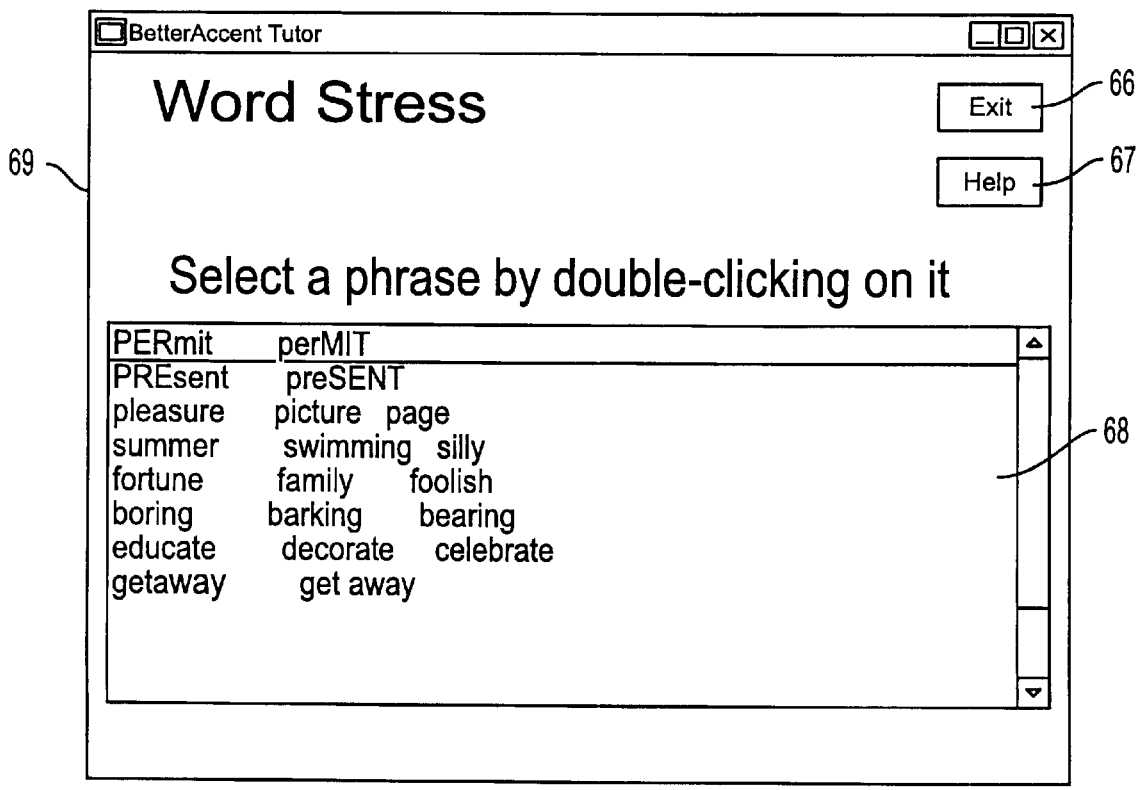

At block 42, the student opens a practice window, an example of which is depicted in FIG. 5. In accordance with another aspect of the present invention, at block 43, the student chooses a visualization mode out of the three possible modes: Intonation Mode, Stress/Rhythm Mode and Waveform Mode. Intonation Mode displays a graphical representation of the pitch values on the vocal part of each syllable of the utterance. Stress/Rhythm Mode displays a graphical representation of each syllable of the intonation as steps, where the width of each step represents the duration of the corresponding syllable and the height of each step represents the energy in the vowel of the corresponding syllable. Waveform Mode displays a graphical representation of the speech waveform. Alternatively, the student may choose to receive audio feedback only.

At block 44, the student optionally may choose to play a native speaker's pre-recorded utterance and study, depending on the visualization mode chosen, the intonation, stress/rhythm or waveform patterns for the utterance. The software also provides a graphical representation of the boundaries of the syllables of the utterance.

At block 45, the student speaks the utterance into microphone 26, and the sample utterance is digitized and recorded as described in the above-incorporated patent. The system then analyzes the sample utterance, at block 46, as described in the above-incorporated patent and hereinbelow with respect to FIG. 4, and displays the metrics appropriate for the visualization mode selected.

At step 47, the student plays the recording and displays the results of the analysis. Depending on the visualization mode chosen, Intonation Mode, Stress/Rhythm Mode or Waveform Mode, the appropriate metrics are displayed, along with an indication of the boundaries of the syllables of the utterance. The results of the analysis are displayed in a student's window, positioned beneath a graphical representation of the corresponding metric for the pre-recorded utterance, to permit ease of comparison (see, e.g., FIGS. 7–9).

Figure 4:
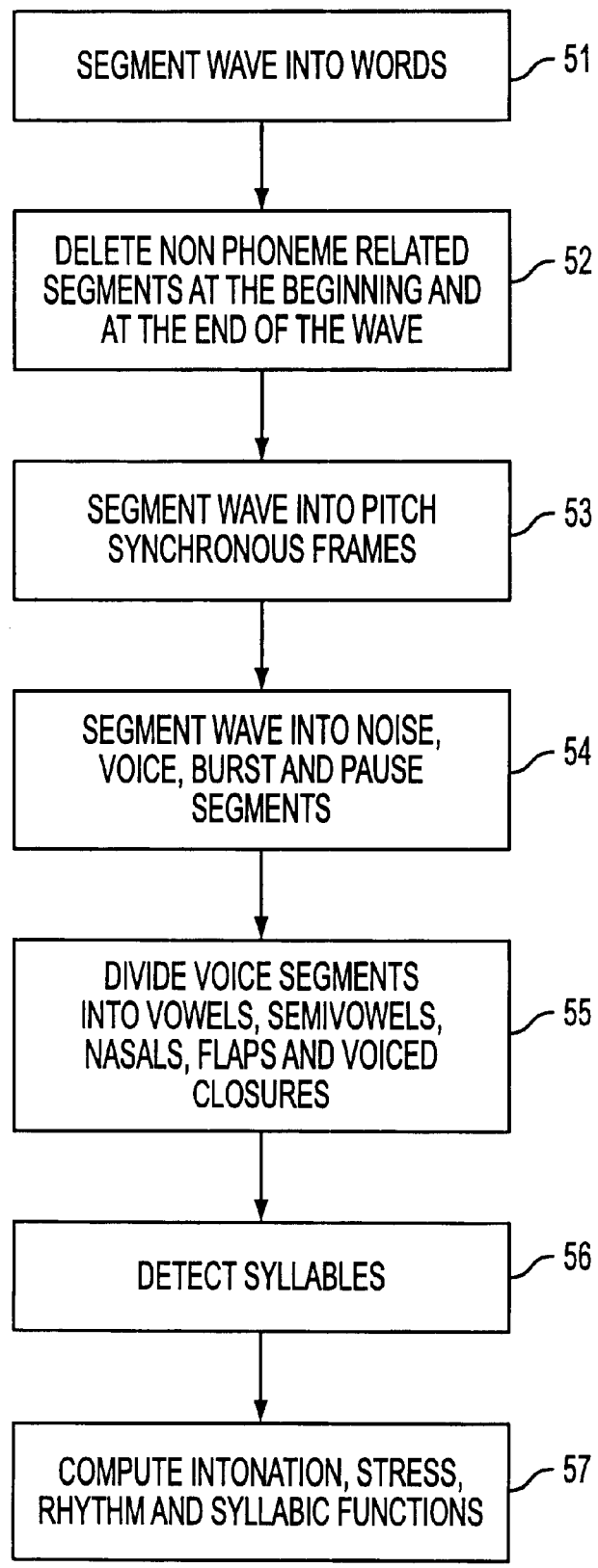
FIG. 4 illustrates a process of analyzing a student's utterance to extract prosodic features that are to be displayed as visual feedback to the student.

Referring now to FIG. 4, the process of analyzing a student's utterance and extracting prosodic features to be displayed as visual feedback to the student is described. Blocks 51–54 may employ, for example, the process steps described in FIG. 4, and column 17, line 35 through column 33, line 37, of the above-incorporated U.S. Pat. No. 5,799,276.

In particular, the system starts the analysis of a student's recorded utterance at block 51 by dividing the utterance into segments that contain one or more continuously pronounced words and inter-word pauses. At block 52, irrelevant segments at the beginning and end of the utterance, for example, attributable to such events as lip smacks, microphone clicks and other extraneous noises, are deleted.

At block 53, the speech utterance is segmented into pitch synchronized frames by detecting the excitation points of vocal cords that constitute the beginnings of pitch synchronous frames. At block 54, the speech utterance is segmented into noise, voice, burst and pause segments. At block 55, voice intervals are segmented into vowels, semivowels, nasals, flaps and voiced closures.

For the purpose of syllable detection, vowels are defined as those segments that pass the following test: (1) the segment has formants; (2) the segment should not be a flap; (3) the vowel weight of the segment should be at least 60% of its nasal-glide weight.

Special considerations are required for parasitic vowels. For example, a segment that is not a vowel but has some features of a vowel may occasionally be mistaken for a vowel, such as with low energy, low periodical segments situated far from true vowels. These segments may be produced during hesitation at the beginning of the sentence or after a breath pause. If a suspicious vowel segment is further than 400 Msec from the closest consonant, has length less than 100 Msec and has energy lower than 10% of the neighboring vowels, the segment is deemed a parasitic vowel and is discarded.

At block 56, syllables are constructed out of the segments detected at blocks 51–55. By definition, a syllable is build around a vowel, and consists of one vowel and zero or more surrounding consonants. Thus, after vowel/non-vowel division is completed, each sequence of continuously pronounced words is regrouped according to the following rules:

1. Each vowel constitutes the core of one syllable;
2. If within a sequence there is only one vowel, then this sequence is one syllable that spans from the beginning to the end of the sequence;
3. If there is more than one vowel in the sequence, there may be contention as to which consonant between two vowels belongs to which syllable. That is, assuming that the sequence is . . . , $v_k, C_1, \ldots, c_n, v_{k+1}, \ldots$, where v represents a vowel and c represents a consonant, it must be determined which of the consonants $c_i$ belong to the syllable $S_k$ generated by the vowel $v_k$ and which of the consonants $c_i$ belong to the syllable $S_{k+1}$ generated by the vowel $V_{k+1}$.

In case (3) above, the following algorithm is applied to determine membership of a consonant. First, all consonants in the sequence that are located prior to the first vowel $v_1$ of the sequence belong to the first syllable $s_1$ formed by $v_1$. Similarly, all consonants in the sequence that are located after the last vowel of the sequence belong to the last syllable of the sequence. For a consonant located between two vowels, if the energy of vowel $v_k$ is greater than or equal to the energy of vowel $v_{k+1}$, then:

If n=1 then $c_1 \epsilon S_k$.
If n>1 then $c_n \epsilon S_{k+1}$ while $c_1, \ldots, c_{n-1} \epsilon S_K$.
The case when Energy($v_k$)<Energy($v_{k+1}$) is treated analogously.

At block 57, the system computes intonation, stress, rhythm and syllabic functions of the speech utterance. For each syllable the following parameters are calculated:

1. the energy of the vowel contained in the syllable;
2. the length of the syllable, in samples;
3. the coordinates of the beginning and the end of the vocal part of the syllable, in samples, where the vocal part of a syllable is defined as the maximal continuous vocal segment of the syllable containing the vowel of the syllable; and
4. the pitch values within the vocal part of the syllable. These values are calculated using pitch synchronous segmentation of the frames that are produced during the wave segmentation process described hereinabove with respect to block 51. The pitch value is equal to the number of samples in one second divided by the length of a frame in samples.

The foregoing features are then graphically displayed to the student, as described hereinabove with respect to block 47 of FIG. 3.

In a preferred implementation of the system of the present invention, the following information is presented to the student: in Intonation Mode, the pitch values on the vocal part of each syllable are presented as a graph; in Stress/Rhythm Mode, the syllables are presented as steps, where the width of a step represents the duration of the corresponding syllable and the height of a step represents the energy of the vowel in the corresponding syllable; and in Waveform Mode, the original speech signal is presented. In all visualization modes the syllable boundaries are presented during playback of the utterance.

With respect to FIGS. 5 through 10, preferred embodiments of a graphical user interface and methods of visualizing prosodic features are described. FIGS. 5A and 5B are exemplary screen displays of navigation screens for a sample curriculum. Boxes 64 and 69 show the current chapter, subchapter or exercise. Boxes 63 and 68 show the list of corresponding subchapters, exercises or utterances, depending on the student's current position within the curriculum. Buttons 61 and 66 are Exit buttons that return the student to the parent node in the navigation graph. Buttons 62 and 67 are Help buttons that may be used to access the Help file, which may include, for example, a detailed explanation of the curriculum.

Figure 6:
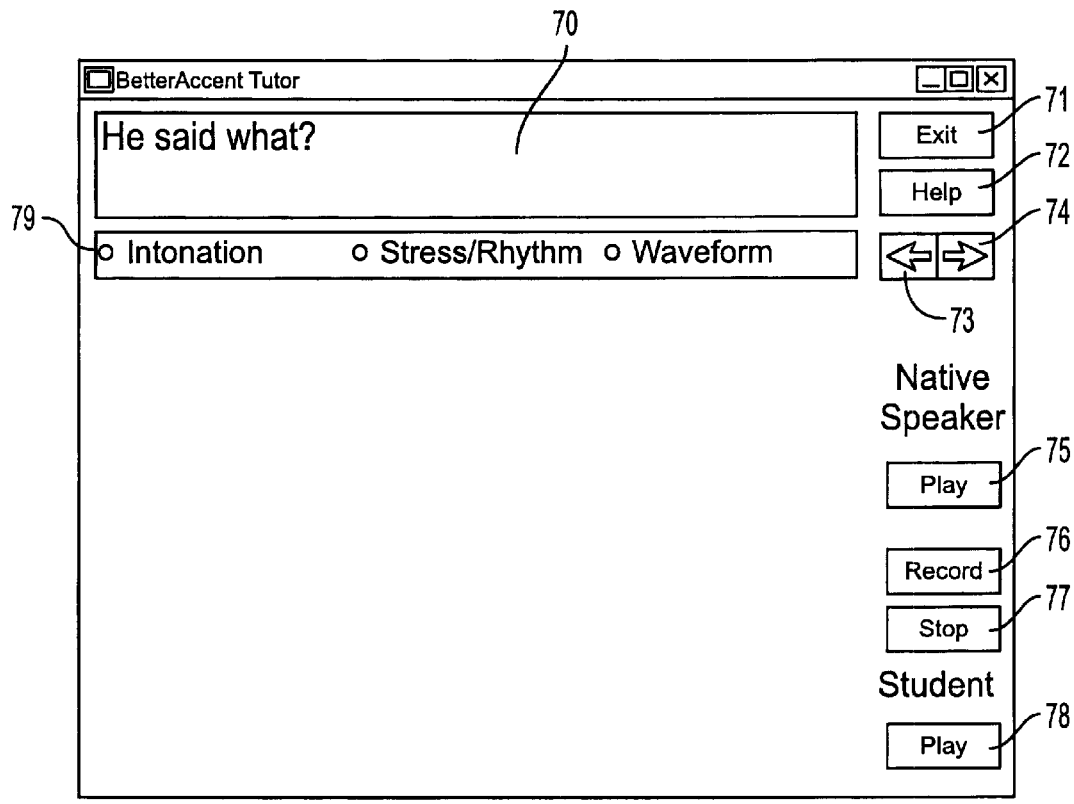
FIG. 6 is an example of a practice window in which no visualization mode has been selected.

FIG. 6 is an example screen of the practice window with no visualization mode chosen, for example, where a visualization mode has not yet been chosen, or the student chooses not to use visualization of the native speaker's pronunciation as a hint. The student may select one of the three visualization modes by selecting Intonation, Stress/Rhythm or Waveform modes in the block 79.

Box 70 shows the text of the current utterance. Button 71 is an Exit button that returns the student to the parent node in the navigation graph. Button 72 is a Help button, as described hereinabove. Button 73 transfers the student to the previous utterance in the list of utterances in an exercise. Button 74 transfers the student to the next utterance in the list of utterances in an exercise. Button 75 is the Play button, which causes the computer to play back the pre-recorded native speaker's utterance.

Button 76 is the Record button, and signals the computer to initiate recording of students' speech. The time interval allowed for the recording depends on the length of the utterance selected for practice, unless Stop button 77 is pressed sooner. When the student's speech is recorded, the analyzed utterance is played back using Play button 78.

Figure 7:
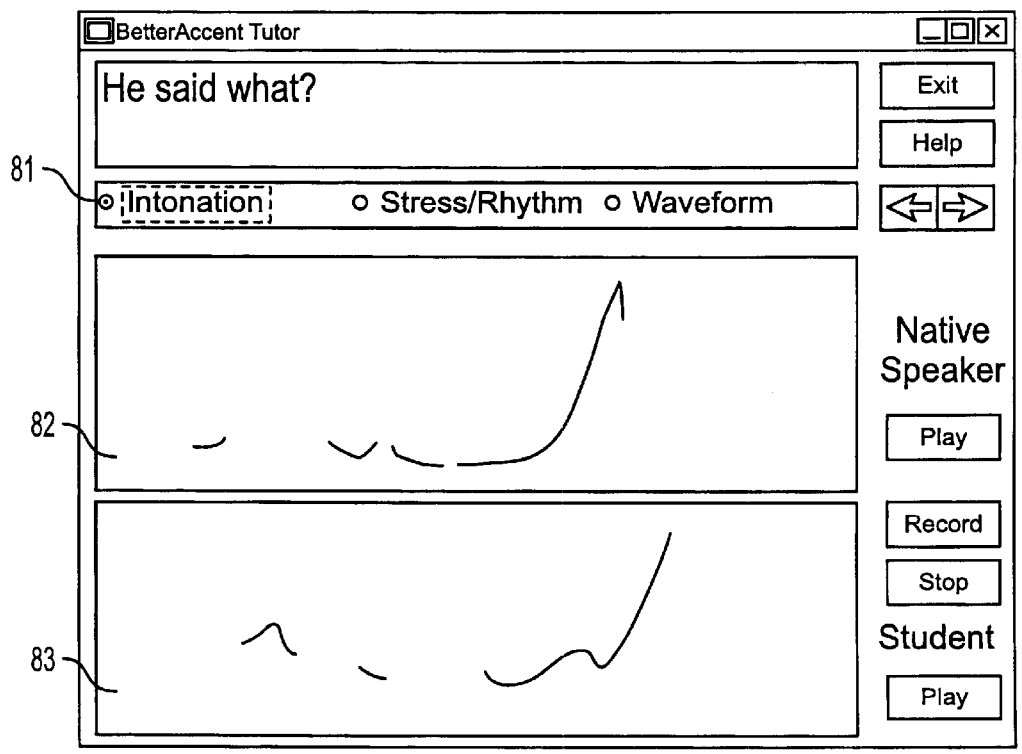
FIG. 7 is an example of a practice window in which an Intonation Mode of visualization has been selected.

Referring to FIG. 7, an example screen is described that depicts a graphical representation of the utterance "He said what?" in the Intonation Mode of visualization of the present invention. Block 81 indicates that the Intonation Mode of visualization has been selected by the student. Box 82 displays the intonation metric of the selected pre-recorded native speaker's utterance. Box 83 displays the intonation metric of the student's recorded utterance.

Figure 8:
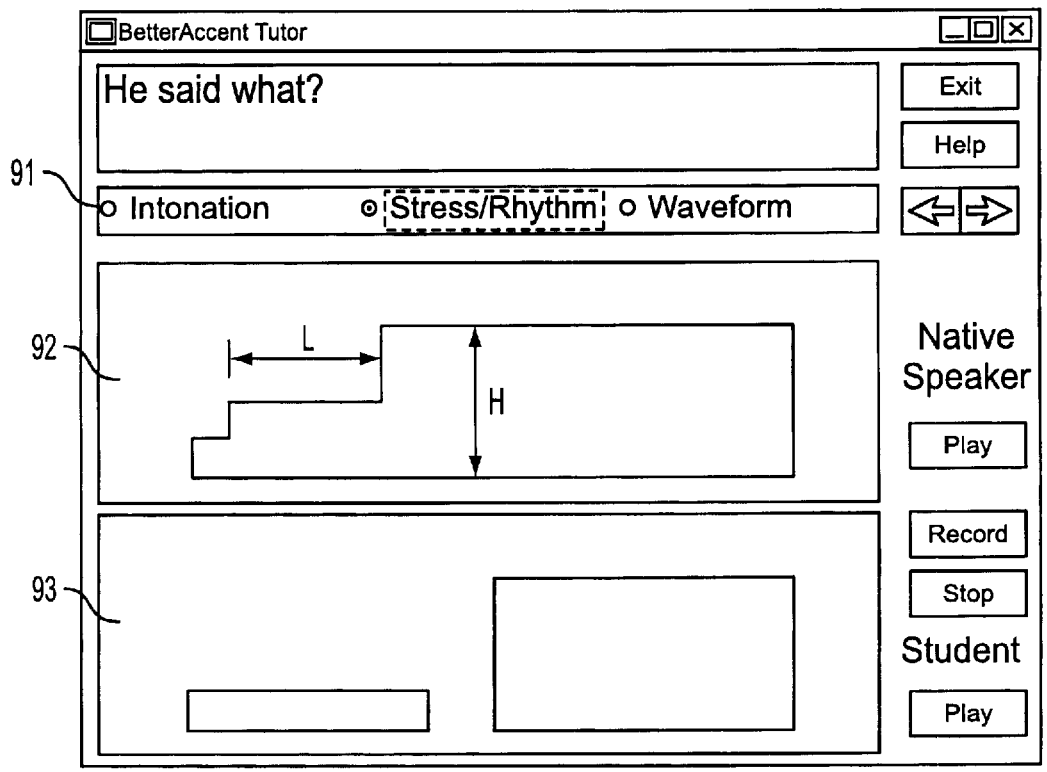
FIG. 8 is an example of a practice window in which a Stress/Rhythm Mode of visualization has been selected.

FIG. 8 is an example screen depicting the graphical representation of the utterance "He said what?" in the Stress/Rhythm Mode of visualization of the present invention. Block 91 indicates that the Stress/Rhythm mode of visualization has been chosen. Box 92 displays the syllables of the selected pre-recorded native speaker's utterance as steps, where length L of a step represents the duration of the corresponding syllable and height H of a step represents the energy of the vowel contained in the corresponding syllable. Box 93 displays similar information for the syllables of the student's recorded utterance.

Figure 9:
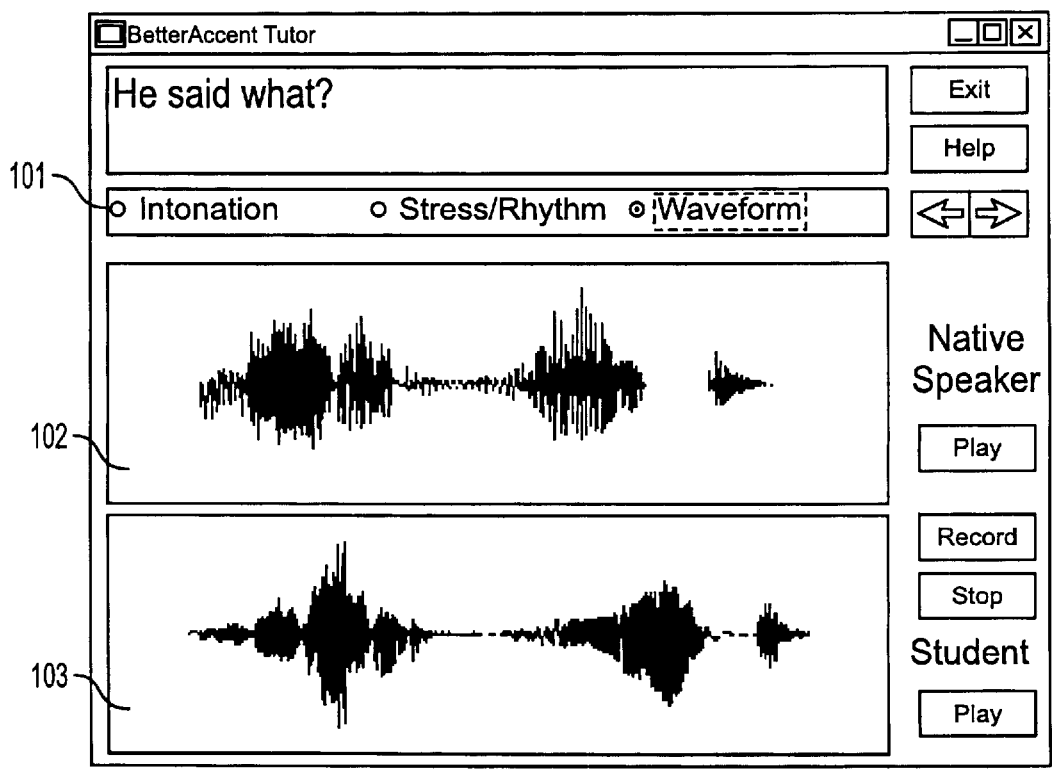
FIG. 9 is an example of a practice window in which a Waveform Mode of visualization has been selected.

FIG. 9 is an example screen depicting the graphical representation of the utterance "He said what?" in the Waveform Mode of visualization of the present invention. Block 101 indicates that the Waveform mode of visualization has been chosen. Box 102 displays waveform samples of the pre-recorded native speaker's utterance. Box 103 displays waveform samples of the student's utterance.

Figure 10A:
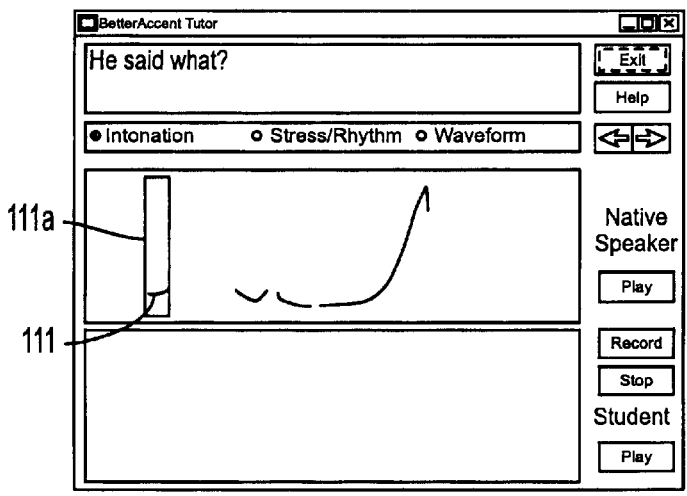
FIGS. 10A to 10C are examples of syllable-by-syllable highlighting during playback in Intonation Mode.
Figure 10B:
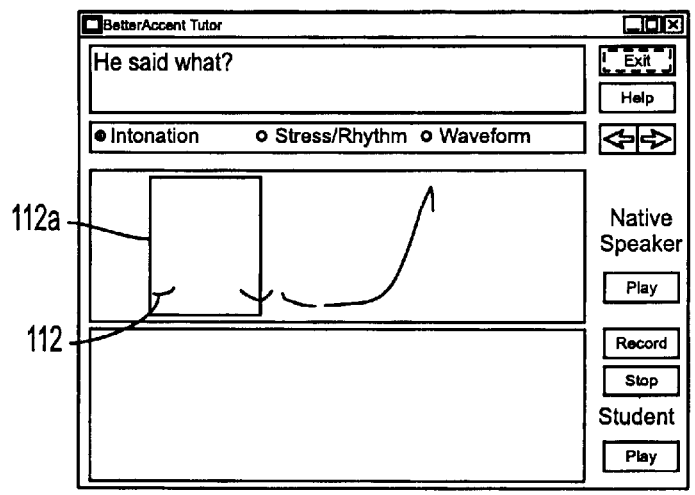
Figure 10C:
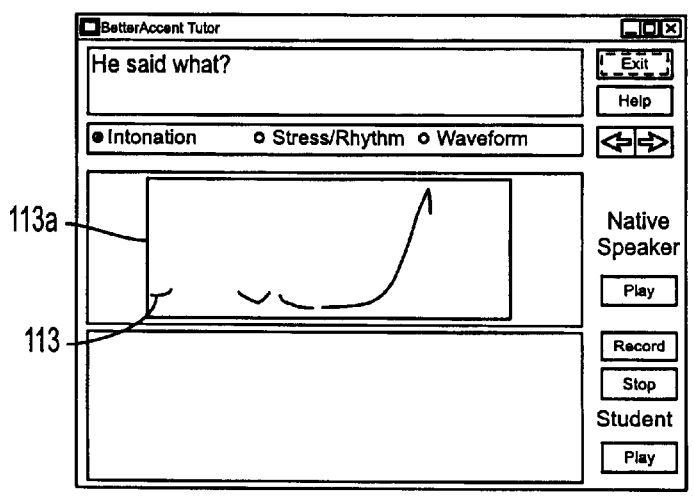

Referring now to FIGS. 10A to 10C, an example of syllable by syllable highlighting during playback in the Intonation mode is described, as implemented in a preferred embodiment of the system of the present invention. The selected pre-recorded utterance of the native speaker is "He said what?".

FIG. 10A is a snapshot of the screen during playback of the first syllable of the utterance—"He", where the portion of the intonation metric that corresponding to the syllable is highlighted (indicated by shaded area 111a). FIG. 10B is a snapshot of the screen during playback of the second syllable—"said", where the portions of the intonation metric corresponding to the first two syllables are highlighted (shaded area 112a). FIG. 10C is a snapshot of the screen during playback of the third syllable "what", where the portions of the intonation metric corresponding to the first three syllables are highlighted (shaded area 113a). In accordance with the principles of the present invention, the syllable by syllable highlighting illustrated in FIGS. 10A to 10C also is preferably provided in the Stress/Rhythm Mode and Waveform Mode of visualization.

While the present invention is described as employing the knowledge-based speech recognition system described in the above-incorporated U.S. Pat. No. 5,799,276, it is to be understood that the analysis techniques and graphical presentation methods of the present invention may be readily adapted for use with other speech recognition or speech analysis apparatus and methods that provide suprasegmental analysis.

Moreover, modifications and additions may be made to adapt the system and methods of the present invention to a variety of applications where audio-visual feedback of the speech signal is desirable, as will be apparent to those skilled in the art based upon the foregoing disclosure. The foregoing embodiments are merely illustrations of the principles of this invention, and therefore various modifications can be made by those skilled in the art without departing from the scope and spirit of the invention.

What is claimed is:

1. A speech analysis system for voice and pronunciation training, the system stored as a series of programmed routines on a removable item of storage media, the system comprising:

a data file that stores a pre-recorded utterance by a native speaker comprising a sequence of syllables and a first example metric corresponding to a pitch value of a vocal part of each one of the sequence of syllables;

a speech capture routine that captures a sample utterance spoken by a user;

a segmentation routine that segments the sample utterance into a sequence of syllables;

a computation routine that computes a first sample metric corresponding to a pitch value of a vocal part of each one of the sequence of syllables for the sample utterance; and a display routine for graphically displaying the first example metric and the first sample metric to the user on a side-by-side basis.

2. The speech analysis system of claim 1 wherein the segmentation routine divides the sample utterance into vowel segments and non-vowel segments.

3. The speech analysis system of claim 2 wherein the segmentation routine regroups the vowel segments and non-vowel segments into syllables depending upon relative energy levels of the vowel segments.

4. The speech analysis system of claim 1 further comprising a routine that deletes parasitic vowels at the beginning or end of the sample utterance.

5. The speech analysis system of claim 1 wherein the display routine graphically identifies boundaries between syllables in the sequence of syllables of the sample utterance.

6. The speech analysis system of claim 1 further comprising a series of navigation screens that enable a user to select from amongst a curriculum comprising a plurality of pre-recorded utterances.

7. The speech analysis system of claim 1 wherein the segmentation routine and the computation routine are capable of processing pre-recorded utterances independently of the language of the native speaker.

8. The speech analysis system of claim 1 wherein the data file also stores a second example metric corresponding to a duration, and an energy of the vocal part of, each one of the sequence of syllables of the pre-recorded utterance, the computation routine further computing a second sample metric corresponding to a duration and an energy of the vocal part of each one of the sequence of syllables of the sample utterance, and the display routine further selectably displays either the first example metric and the first sample metric to the user on a side-by-side basis or the second example metric and the second sample metric to the user on a side-by-side basis.

9. The speech analysis system of claim 8 wherein the display routine graphically represents the sequence of syllables as a series of steps, wherein for each syllable in the sequence, a length of each step represents the duration of the corresponding syllable and a height of each step represents the energy of the corresponding syllable.

10. The speech analysis system of claim 1 wherein the display routine further selectably displays either the first example metric and the first sample metric to the user on a side-by-side basis or a waveform for the pre-recorded utterance and a waveform for the sample utterance to the user on a side-by-side basis.

11. A speech analysis system for voice and pronunciation training, the system stored as a series of programmed routines on a removable item of storage media, the system comprising:

a data file that stores a pre-recorded utterance by a native speaker comprising a sequence of syllables and a first example metric corresponding to a duration, and an energy of the vocal part of, each one of the sequence of syllables;

a speech capture routine that captures a sample utterance spoken by a user;

a segmentation routine that segments the sample utterance into a sequence of syllables;

a computation routine that computes a first sample metric corresponding to a duration, and an energy of a vocal part of, each one of the sequence of syllables for the sample utterance; and a display routine for graphically displaying the first example metric and the first sample metric to the user on a side-by-side basis.

12. The speech analysis system of claim 11 wherein the display routine graphically represents the sequence of syllables as a series of steps, wherein for each syllable in the sequence, a length of each step represents the duration of the corresponding syllable and a height of each step represents the energy of the corresponding syllable.

13. The speech analysis system of claim 11 wherein the segmentation routine divides the sample utterance into vowel segments and non-vowel segments.

14. The speech analysis system of claim 13 wherein the segmentation routine regroups the vowel segments and non-vowel segments into syllables depending upon relative energy levels of the vowel segments.

15. The speech analysis system of claim 11 further comprising a routine that deletes parasitic vowels at the beginning or end of the sample utterance.

16. The speech analysis system of claim 11 wherein the display routine graphically identifies boundaries between syllables in the sequence of syllables of the sample utterance.

17. The speech analysis system of claim 11 further comprising a series of navigation screens that enable a user to select from amongst a curriculum comprising a plurality of pre-recorded utterances.

18. The speech analysis system of claim 11 wherein the segmentation routine and the computation routine are capable of processing pre-recorded utterances independently of the language of the native speaker.

19. The speech analysis system of claim 11 wherein the data file also stores a second example metric corresponding to a pitch value of a vocal part of each one of the sequence of syllables of the pre-recorded utterance, the computation routine further computing a second example metric corresponding to a pitch value of a vocal part of each one of the sequence of syllables of the sample utterance, and the display routine further selectably displays either the first example metric and the first sample metric to the user on a side-by-side basis or the second example metric and the second sample metric to the user on a side-by-side basis.

20. The speech analysis system of claim 11 wherein the display routine further selectably displays either the first example metric and the first sample metric to the user on a side-by-side basis or a waveform for the pre-recorded utterance and a waveform for the sample utterance to the user on a side-by-side basis.

21. A method of analyzing speech for voice and pronunciation training, the method comprising:

storing a pre-recorded utterance by a native speaker comprising a sequence of syllables and a first example metric corresponding to a pitch value of a vocal part of each one of the sequence of syllables;

capturing a sample utterance spoken by a user;

segmenting the sample utterance into a sequence of syllables;

computing a first sample metric corresponding to a pitch value of a vocal part of each one of the sequence of syllables for the sample utterance; and graphically displaying the first example metric and the first sample metric to the user on a side-by-side basis.

22. The method of claim 21 wherein segmenting the sample utterance further comprises dividing the sample utterance into vowel segments and non-vowel segments.

23. The method of claim 22 wherein segmenting the sample utterance further comprises regrouping the vowel segments and non-vowel segments into syllables depending upon relative energy levels of the vowel segments.

24. The method of claim 21 further comprising deleting parasitic vowels at the beginning or end of the sample utterance.

25. The method of claim 21 further comprising graphically identifying boundaries between syllables in the sequence of syllables of the sample utterance.

26. The method of claim 21 further comprising navigating through a plurality of navigation screens to select from amongst a curriculum comprising a plurality of pre-recorded utterances.

27. The method of claim 21 wherein segmenting the sample utterance and computing a first sample metric are performed independently of the language of the native speaker of the pre-recorded utterance.

28. The method of claim 21 further comprising:
storing a second example metric corresponding to a duration, and an energy of the vocal part of, each one of the sequence of syllables of the pre-recorded utterance;
computing a second sample metric corresponding to a duration and an energy of the vocal part of each one of the sequence of syllables of the sample utterance; and
selectably graphically displaying either the first example metric and the first sample metric to the user on a side-by-side basis or the second example metric and the second sample metric to the user on a side-by-side basis.

29. The method of claim 28 wherein graphically displaying the second sample metric comprises graphically representing the sequence of syllables as a series of steps, wherein for each syllable in the sequence, a length of each step represents the duration of the corresponding syllable and a height of each step represents the energy of the corresponding syllable.

30. The method of claim 21 further comprising selectably graphically displaying either the first example metric and the first sample metric to the user on a side-by-side basis or a waveform for the pre-recorded utterance and a waveform for the sample utterance to the user on a side-by-side basis.

31. A method of analyzing speech for voice and pronunciation training, the method comprising:
storing a pre-recorded utterance by a native speaker comprising a sequence of syllables and a first example metric corresponding to a duration, and an energy of a vocal part of, each one of the sequence of syllables;
capturing a sample utterance spoken by a user;
segmenting the sample utterance into a sequence of syllables;
computing a first sample metric corresponding to a duration, and an energy of a vocal part of, each one of the sequence of syllables for the sample utterance; and
graphically displaying the first example metric and the first sample metric to the user on a side-by-side basis.

32. The method of claim 31 wherein graphically displaying the second sample metric comprises graphically representing the sequence of syllables as a series of steps, wherein for each syllable in the sequence, a length of each step represents the duration of the corresponding syllable and a height of each step represents the energy of the corresponding syllable.

33. The method of claim 31 wherein segmenting the sample utterance further comprises dividing the sample utterance into vowel segments and non-vowel segments.

34. The method of claim 33 wherein segmenting the sample utterance further comprises regrouping the vowel segments and non-vowel segments into syllables depending upon relative energy levels of the vowel segments.

35. The method of claim 31 further comprising deleting parasitic vowels at the beginning or end of the sample utterance.

36. The method of claim 31 further comprising graphically identifying boundaries between syllables in the sequence of syllables of the sample utterance.

37. The method of claim 31 further comprising navigating through a plurality of navigation screens to select from amongst a curriculum comprising a plurality of pre-recorded utterances.

38. The method of claim 31 wherein segmenting the sample utterance and computing a first sample metric are performed independently of the language of the native speaker of the pre-recorded utterance.

39. The method of claim 31 further comprising:
storing a second example metric corresponding to a pitch value of a vocal part of each one of the sequence of syllables of the pre-recorded utterance;
computing a second sample metric corresponding to a pitch value of a vocal part of each one of the sequence of syllables of the sample utterance; and
selectably graphically displaying either the first example metric and the first sample metric to the user on a side-by-side basis or the second example metric and the second sample metric to the user on a side-by-side basis.

40. The method of claim 31 further comprising selectably graphically displaying either the first example metric and the first sample metric to the user on a side-by-side basis or a waveform for the pre-recorded utterance and a waveform for the sample utterance to the user on a side-by-side basis.

* * * * *